(12) United States Patent
Huisman et al.

(10) Patent No.: US 8,641,080 B2
(45) Date of Patent: Feb. 4, 2014

(54) AIR BAG CONTAINER

(75) Inventors: Marc Rudolf Stefan Huisman, Maastricht (NL); Marnix Van Gurp, Sittard (NL); Jeroen Joost Crevecoeur, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 705 days.

(21) Appl. No.: 12/808,835

(22) PCT Filed: Dec. 16, 2008

(86) PCT No.: PCT/EP2008/067627
§ 371 (c)(1),
(2), (4) Date: Oct. 22, 2010

(87) PCT Pub. No.: WO2009/080616
PCT Pub. Date: Jul. 2, 2009

(65) Prior Publication Data
US 2011/0042928 A1 Feb. 24, 2011

(30) Foreign Application Priority Data

Dec. 20, 2007 (EP) .................................. 07024767

(51) Int. Cl.
*B60R 21/16* (2006.01)
(52) U.S. Cl.
USPC .................... 280/728.1; 280/743.1; 428/34.1; 428/474.4

(58) Field of Classification Search
USPC ......... 280/728.1, 743.1; 428/34.1, 34.3, 34.5, 428/474.4, 475.5
See application file for complete search history.

(56) References Cited

U.S. PATENT DOCUMENTS

| | | | |
|---|---|---|---|
| 5,457,156 | A | 10/1995 | Liu et al. |
| 6,521,326 | B1 * | 2/2003 | Fischer et al. ............... 428/198 |
| 2004/0235999 | A1 | 11/2004 | Vathauer et al. |
| 2006/0276582 | A1 | 12/2006 | Mochizuki et al. |
| 2007/0135570 | A1 | 6/2007 | Krishnamurthy et al. |

FOREIGN PATENT DOCUMENTS

| | | |
|---|---|---|
| DE | 196 39 865 | 4/1997 |
| DE | 101 41 943 | 4/2003 |
| EP | 0 582 443 | 2/1994 |
| EP | 1 333 060 | 8/2003 |
| WO | WO 2006/034388 | 3/2006 |

OTHER PUBLICATIONS

International Search Report for PCT/EP2008/067627, mailed Mar. 24, 2009.

* cited by examiner

*Primary Examiner* — Arti Singh-Pandey
(74) *Attorney, Agent, or Firm* — Nixon & Vanderhye P.C.

(57) ABSTRACT

The present invention relates to an air bag container consisting of an impact modified polyamide composition, wherein the polyamide composition has a Melt Volume-Flow Rate higher than 25 cm$^3$/10 minutes. The polyamide composition preferably comprises a base polyamide, an impact modifier, reinforcing compounds and a flow improver.

13 Claims, 3 Drawing Sheets

AIR BAG CONTAINER

This application is the U.S. national phase of International Application No. PCT/EP2008/067627 filed 16 Dec. 2008, which designated the U.S. and claims priority to EP Application No. 07024767.1 filed 20 Dec. 2007, the entire contents of each of which are hereby incorporated by reference.

TECHNICAL FIELD

The present invention relates to an air bag container consisting of an impact modified polyamide composition.

BACKGROUND AND SUMMARY

Air bag containers, also called air bag canisters, are housings for motor vehicle safety airbags. Airbags are a key passenger safety feature. When called upon, they have to work perfectly and they only have one chance to do that. Airbag systems undergo destructive testing as they cannot be individually tested to determine whether each one works properly before installation in the vehicle. Manufacturers have to be sure that the airbag they build will work as intended. To do that, they need to design and build systems with known safety margins that exceed the performance requirements. Airbag safety devices are complex systems where every component contributes to a safe deployment. The more accurately a component can be made and the narrower the tolerances, the more assured is the performance. Airbag containers or airbag housings are passive components that play a role as vital as the more familiar key components, which are the gas generator, airbag and the cover. The housings are passive as they have to remain as they were before deployment. If the housing experiences unforeseen deformation under the force of the explosive charge and if it starts to crack and split, the airbag will not deploy as designed with potentially disastrous consequences for any vehicle occupant. Worse still, if the housing undergoes drastic and brittle failure, fragments of the housing can cause serious harm to the driver or passenger who the system is intended to protect. In view of this, air bag containers must have a high dynamic burst pressure resistance, because air bag containers are subjected, when deployed, to a sudden and intense internal pressure.

The material currently applied for air bag containers are mainly metal but also plastic airbag containers are more and more applied in view of the reduced weight. Air bag containers have to work in extreme conditions, demonstrating that they can perform under all conditions; at extreme low temperatures, down to $-35°$ C., and high temperatures, up to $85°$ C. At low temperatures, the risk is that the plastic housing will crack and fail by brittle fracture, leading to inadequate or failed airbag deployment and splinter generation. At high temperatures, the plastic materials have to retain sufficient strength or fracture will occur with similar consequences or even worse consequences. Only dedicated developed materials will survive these extreme conditions. Impact modified, reinforced polyamide-6 compositions are currently applied for air bag containers requiring high dynamic burst pressure. These compositions can be formulated to have very high impact performance at low temperature, thus avoiding brittle failures, while retaining more than enough strength to perform at high temperatures. Impact modified, reinforced polyamide-6 compositions can be formulated such that an air bag container consisting of such composition possess a dynamic burst pressure higher than 1.6 MPa (measured at $-35°$ C.). Another requirement however is a cost effective production process for such moulded parts, among other things short cycle times. A disadvantage of such impact modified polyamide compositions that can advantageously be used for moulding air bag containers requiring high dynamic burst pressure, in particular at low temperature, and high strength, in particular at high temperature, is that the melt flow of such compositions is relatively low, resulting in longer cycle times of the moulding process and thus in a slower and more costly moulding process. The cycle time of a moulding process is usually referred to the time span that starts when the mould closes and ends when the mould opens and the part is ejected. The cycle time is usually dominated by the cooling of the part inside the mould cavity. The cycle time can be calculated using $t_{cycle} = t_{closing} + t_{injection} + t_{cooling} + t_{ejection}$, where the closing time $t_{closing}$, the injection time $t_{injection}$ and ejection time $t_{ejection}$ only last from a fraction of second to a few seconds and the cooling time $t_{cooling}$ dominates the process. However, the addition of components to the polyamide composition intended to increase the melt flow of the composition usually results in a significant decrease of the dynamic burst pressure of the moulded part. Thus, one difficulty with such compositions is the achieving and sustaining of high melt flow polyamide compositions without significantly compromising the dynamic burst pressure performance of the air bag container, in particular at low temperature.

The invention now aims to provide an air bag container with a high melt flow, but not at the expense of the desired property of high dynamic burst pressure, in particular at low temperature. More in particular, the aim of the present invention is a uniquely favourable balance of high dynamic burst pressure, in particular at low temperature, and short cycle time.

The invention relates to air bag containers consisting of an impact modified polyamide composition having a Melt Volume-Flow Rate (MVR) higher than 25 cm$^3$/10 minutes ($275°$ C./5 kg).

Surprisingly it has been found that the dynamic burst pressure performance of impact modified polyamide composition could be retained to a high degree and at a sufficient high level, whilst at the same time major cycle time reduction can be achieved. More in particular, dynamic burst pressures up to and even higher than 2 MPa, measured at $-35°$ C., could be obtained, using a polyamide composition with such a high melt flow.

Preferably, the dynamic burst pressure at $-35°$ C. is higher than 1.6 MPa, more preferably higher than 1.7 MPa and even more preferably higher than 1.8 MPa.

It has been found that the Melt Volume-Flow Rate of the polyamide composition can even be increased to a value higher than 30 cm$^3$/10 minutes, even to a value higher than 40 cm$^3$/10 minutes ($275°$ C./5 kg). The Melt Volume-Flow Rate of the polyamide composition is generally lower than 100 cm$^3$/10 minutes ($275°$ C./5 kg) and is mostly lower than 80, because at a Melt Volume-Flow Rate of the polyamide composition higher than 100 it is almost impossible to keep the dynamic burst pressure at $-35°$ C. at a sufficient high level.

DETAILED DESCRIPTION

Figure 1:
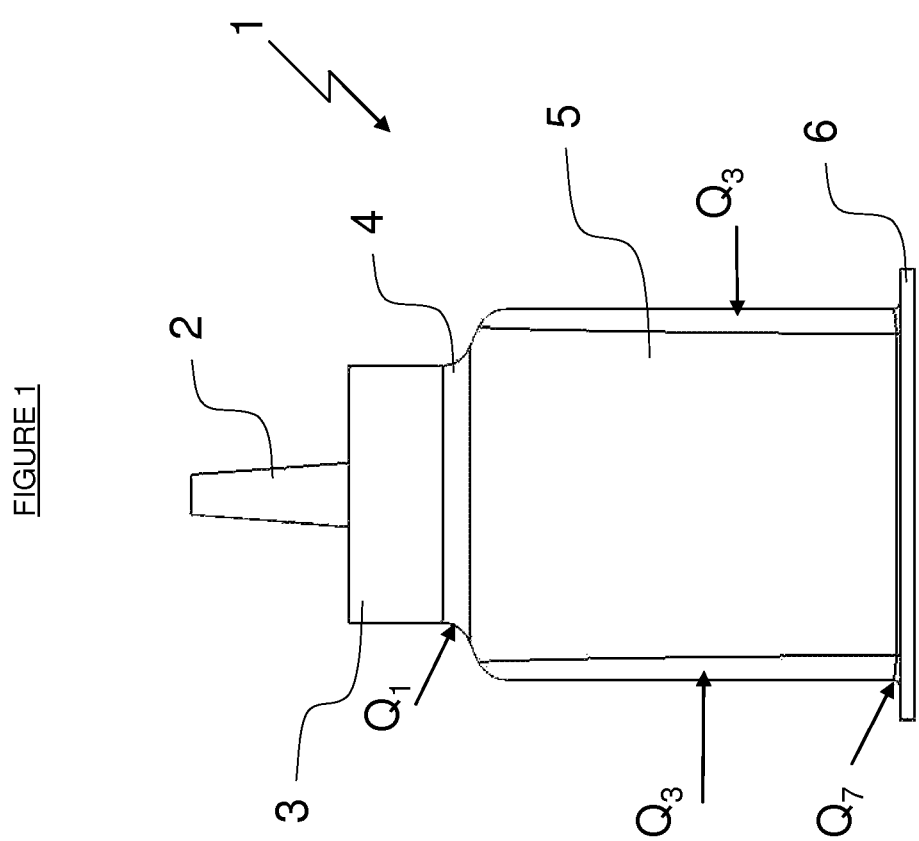
FIG. 1 represents a moulded part resembling an air bag container.

The melt volume-flow rate (MVR) is a commonly applied measurement method for determining the melt flow of thermoplastic materials. The International Standard ISO 1133: 2005-06-01 specifies the procedure for the determination of the MVR of thermoplastic materials under specified conditions of temperature and load. However, there are a number of conditions not specified in ISO 1133: 2005-06-01, nor in the relevant material standard, which are detrimental for the reproducibility of the MVR measurement on thermoplastic materials sensitive to time-temperature and/or moisture, such as for instance polyamide and its compositions. This is already addressed in ISO/CD 1133-2, 2007-03-02, reference number ISO/TC 61/SC5/N 1105, 2007-03-02, titled "Plastics-Determination of the melt mass-flow rate (MFR) and the melt volume-flow rate (MVR) of thermoplastic materials— Part 2: Method for materials sensitive to time-temperature history and/or moisture", in which the conditions detrimental for the reproducibility of the MVR measurement are specified. For the sake of clarity, these conditions are set out and specified herein below. As used herein, the melt volume-flow rate (MVR) is determined according to ISO 1133: 2005-06-01. In addition, the measurement is carried out under the following specified conditions. With respect to the equipment, a standard die of 8.000 mm length and 2.095 mm diameter is used; the maximum allowable variation in temperature of the cylinder with distance and with time throughout the test is ±0.5° C. at 0 mm above the die surface and ±0.3° C. between 10 mm and 70 mm above the die; the temperature of the cylinder is calibrated at 10 mm±0.5 mm intervals from 0 mm above the top of the die up to and including 70 mm above the top of the die using a calibrated instrument; the temperature variation is measured at each position by recording the temperature at 1 min intervals until 10 minutes after the first stable temperature reading; a vacuum oven with a $N_2$-purge at a maximum pressure of 150 mbar is used. With respect to the sample treatment, the test sample is dried prior to testing for 48 h at 95° C.; the moisture content is ≤200 ppm (ISO 15512); the dried material is stored in a dry, preferably hot, container and cooled down to ambient temperature; the test is carried out within 4 hours after cooling down. The sample amount is such that in all cases the measurement will start between 5 minutes 15 seconds and 5 minutes 30 seconds after completing the charging of the material; for comparison of materials the sample volume is within ±0.5 cm³ of each other. With respect to the MVR test conditions, the test temperature is 275° C.; the load is 5 kg and the preheating time is 5 minutes. With respect to the measurement itself, the sample handling shall be not longer than 1 minute before charging the material; the charging process must be completed between t=0.5 min and t=1 min, the loaded piston or unloaded piston on the material in the cylinder is put in such a way that the applied load on the material during the preheating time is negligible, e.g. by using a weight support; the selected load is applied on the material at t=5 minutes after completing the charging of the cylinder with the test sample; the test is started when the lower reference mark has reached the top edge of the cylinder but between 15 and 30 seconds after applying the load; the time taken for the piston to travel a specified distance of between 25 mm and 30 mm is measured; the test shall stop before or when the second mark reaches the top of the cylinder.

Figure 2:
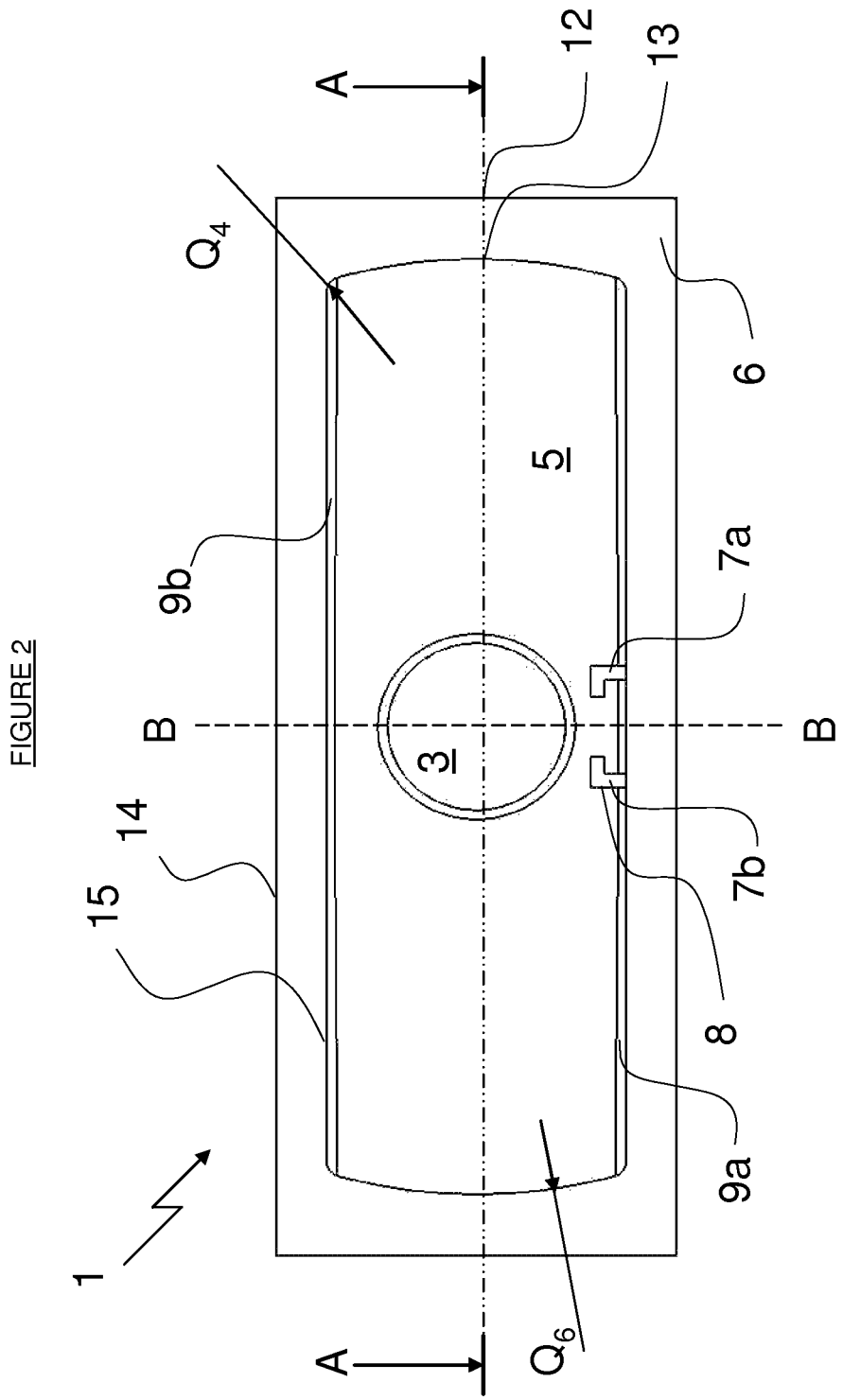
FIG. 2 represents a bottom view of the moulded part of FIG. 1.
Figure 3:
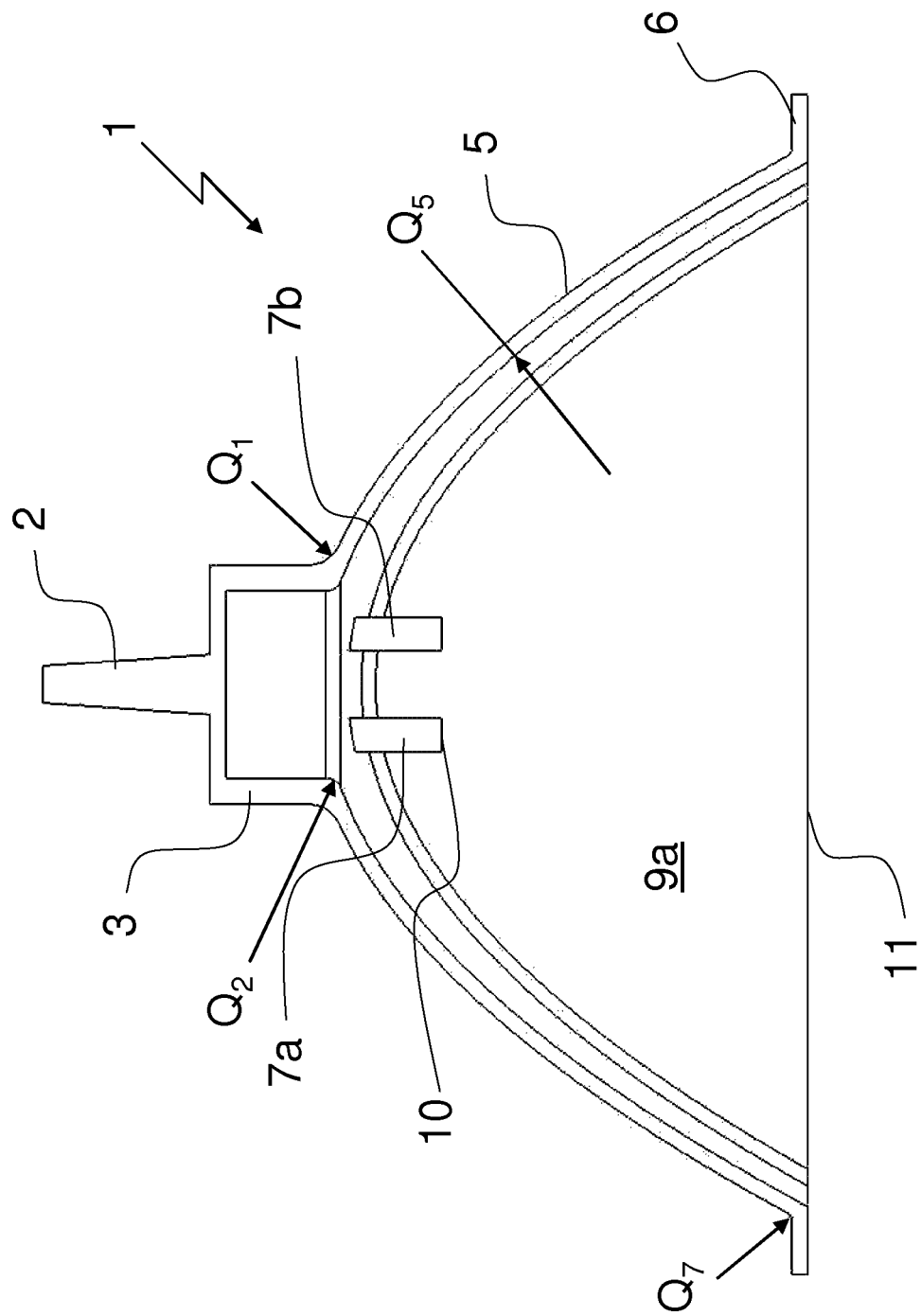
FIG. 3 represents a perpendicular cross-sectional view of the moulded part in FIG. 1 taken along line A-A therein.

As used herein, dynamic burst pressure of an air bag container is determined by moulding a thermoplastic resin composition into an unwelded, hollow part having a thickness of 2 mm and having the shape of an air bag container (herein after referred to as the moulded part), fixing the part between a plate and a clamp, and applying pressure internally to the part until the part bursts. The pressure at which the part bursts is the dynamic burst pressure and is recorded in MPa. The pressure build-up is created by igniting an explosive gas that is formed by filling the moulded part via a valve system with a stoichiometric propane/air or hydrogen/air mixture. The temperature of the moulded part and the temperature of the explosive gas mixture correspond with the temperature at which the burst pressure is determined. The moulded part 1 resembling an air bag container is represented in FIGS. 1-3. FIG. 1 represents a side view of the moulded part 1; FIG. 2 represents a bottom view of the moulded part 1 and FIG. 3 represents a perpendicular cross-sectional view of the moulded part 1 taken from line A-A. The moulded part 1 (see FIG. 1) contains a so-called sprue 2, a cylindrical part 3, a rounded transition 4, a body part 5 and a rim 6. For measuring the dynamic burst pressure, the rim 6 is fixed between a plate and a clamp. Sprue 2 of the moulded part 1 is conical with a bottom diameter of 8 mm, a top diameter of 5 mm and a height of 21 mm. Cylindrical part 3 has an outer diameter of 32 mm and a height of 12.5 mm. Cylindrical part 3 passes into the body part 5 via a transition 4; the transition 4 has a height of 3.6 mm and a radius ($Q_1$) of 4 mm at the outside of the moulded part, a radius ($Q_2$) (FIG. 3) of 2 mm at the inside of the moulded part. In side view (FIG. 1), body part 5 has a height of 63.5 mm, a width of 48 mm and a radius ($Q_3$) at both sides of 5.3 mm at the outside of the moulded part 1. The radius ($Q_4$) (FIG. 2) at the inside of the moulded part 1 is 2.3 mm The cross-sectional view (FIG. 3) shows that the body part is arched with a radius ($Q_5$) of 91.6 mm. The bottom view (FIG. 2) shows that the body part is also arched with a radius ($Q_6$) of 69.9 mm. The side walls 9a and 9b of the body part 5 has a draft of 0.5 degrees for mould release. At one internal side of the body part 5, two identical ribs (7a, 7b) in L-shaped form are present. The two ribs 7a and 7b are symmetrically positioned relative to line B-B. The distance between the line B-B and line 8 is 9 mm. The ribs 9a and 9b have a height of 5 mm, a width of 4.5 mm and a thickness of 2 mm. The distance between line 10 and line 11 is 46.5 mm (FIGS. 1 and 3). Body part 5 passes into a rim 6 via a transition having a radius ($Q_7$) of 1 mm (FIG. 3). In side-view, rim 6 has a width of 56 mm and a height of 2 mm. The rim has the following outer dimensions (see FIG. 2): a total length of 158 mm and a width of 56 mm (see also FIG. 1), a width of 9.1 mm between point 12 and 13 at line A-A and a width of 7 mm between line 14 and 15 (on the side with length 158 mm).

Preferably, the air bag container of the present invention does not contain welds, because the presence of welds reduces the dynamic burst pressure of the air bag container as the weld seam of a welded part is usually the weakest point.

It has in particular been found that a polyamide composition comprising a base polyamide, an impact modifier, reinforcing compounds and a flow improver could advantageously be used to obtain an air bag container having a high dynamic burst pressure at low temperature (−35° C.) and that at the same time can be produced in short cycle time. The present invention therefore also relates to an air bag container consisting of an impact modified polyamide composition comprising a base polyamide, an impact modifier, reinforcing compounds and a flow improver.

The amount of impact modifier in the polyamide composition is generally higher than 4 wt. % and preferably higher than 5 wt. % (relative to the total composition). The amount of impact modifier in the polyamide composition is generally lower than 30 wt. %, in particular lower than 25 wt. %, more in particular lower than 20 wt. % and even more in particular lower than 10 wt. %.

Suitable base polyamides in the composition used for moulding the part according to the present invention include all polyamides, crystalline, semi-crystalline as well as amorphous or mixtures thereof. A survey of polyamides can be found e.g. in Römpp Chemie-Lexikon, 9th edition, volume 5, page 359 ff. and the citations mentioned therein. But the polyamides PA 6, PA 46, PA 66, PA 11, PA 12, PA 6T/66, PA 6T/6I, PA 6I/6T, PA 6/6T, PA 6/66, PA 8T, PA 9T, PA 12T, PA 69, PA 610, PA 612, PA 1012, PA 1212, PA MACM12, PA PACM12, PA MACMT, PA PACP12, PA NDT, PA MXDI, PA NI, PA NT, PA TMHMDAT, PA 12/PACMT/PACMI, PA 12/MACMI/MACMT, PA N12, PA 6/MACMI or blends thereof are preferred. Preferably polyamide-6, polyamide-6,6 or polyamide-4,6 is chosen, or mixtures thereof or copolyamides of the constituting monomers thereof. More preferably the base polyamide is polyamide-6. Even more preferably, the base polyamide is polyamide-6 having a relative solution viscosity higher than 2, preferably higher than 2.2, and lower than 2.8, preferably lower than 2.6. The relative solution viscosity is measured according to ISO 307 and determined using a solution of 1 gram of polyamide-6 in 100 ml of 90% strength formic acid at 25.00° C.

Usually, the polyamide composition comprises base polyamide in an amount of from 30 to 80 wt. % (relative to the total polyamide composition).

Preferably, the polyamide composition comprises flow improver in an amount of from 0.1 to 50 wt. % (relative to the total polyamide composition). More preferably, the polyamide composition comprises flow improver in an amount of from 0.1 to 40 wt. %, even more preferably in an amount of from 0.1 to 30 wt. % and even more preferably in an amount of from 0.1 to 20 wt. % (relative to the total polyamide composition).

For the purposes of the invention, a flow improver decreases the melt viscosity of the polyamide composition. Preferred flow improvers are oligomers. Preferred oligomers are polyamide oligomers. Suitable polyamide oligomers include the above mentioned polyamides with low molecular weight. Preferred polyamide oligomers are polyamide-6 oligomers, polyamide-4,6 oligomers, polyamide-6,6 oligomers or a mixture of at least two of these oligomers. The polyamide oligomer is a low-molecular weight polyamide having a weight-average molecular weight that is preferably lower than the "molecular weight between entanglements" of the base polyamide in the composition. This "molecular weight between entanglements" is for example 5,000 g/mol in the case of polyamide-6. Preferably, the weight average molecular weight is at most 5,000 g/mol, preferably at most 4,000 g/mol, more preferably at most 3,000 g/mol. The molecular weight preferably is not too low either, to avoid the risk of for example the glass transition temperature being lowered. Preferably the weight-average molecular weight is greater than approximately 500 g/mol, more preferably greater than approximately 1,000 g/mol. The amount of oligomer in the polyamide composition is preferably from 0.1 to 20 wt. %, more preferably from 0.1 to 10 wt. %, and even more preferably from 0.1 to 5 wt. %, (relative to the total polyamide composition).

Preferably, the composition comprises a base polyamide with a weight average molecular weight of at least 10,000 g/mol and a polyamide oligomer with a weight average molecular weight of at most 5,000 g/mol.

More preferably, the composition comprises a base polyamide with a weight average molecular weight of at least 15,000 g/mol and a polyamide oligomer with a weight average molecular weight of at most 4,000 g/mol.

Suitable impact modifiers in the composition from which the air bag container according to the present invention consists include the usual polymers that are used for toughening polyamide compositions. Examples of suitable impact modifiers are acid-functional elastomers such as core-shell rubbers and olefinic rubbers containing groups being reactive with polyamide. A survey of impact modifiers can be found e.g. in Nylon Plastics Handbook, 1995 edition, page 415 ff. and the citations mentioned therein. Preferred impact modifiers are rubbers containing apolar monomers such as olefins, and also polar or reactive monomers such as, among others, acrylates, epoxide, acid or anhydride containing monomers. Examples include a copolymer of ethylene with (meth)acrylic acid or an ethylene/propylene copolymer functionalised with anhydride groups.

With rubber is herein meant a flexible rubber with a low modulus and a glass transition temperature lower than 0° C., preferably lower than −25° C. Examples of polymers falling under this definition are copolymers of ethylene and a-olefins, for example propene and butene. Also plastomers, being copolymers of for example ethylene and 1-octene, that can be obtained by polymerisation in the presence of a metallocene catalyst, are suitable as component of the rubber mixture.

As used herein, a functionalised rubber is a rubber containing groups being reactive with polyamide. Such functionalised rubbers are known. For example U.S. Pat. No. 4,174,358 describes a large number of suitable functionalised rubbers as well as the methods for preparing such functionalised rubbers. Highly suitable are olefinic rubbers that are chemically modified by reaction with maleic anhydride or entcopolymers of the rubber with a unsaturated dicarboxylic acid, anhydride and/or esters thereof, for example maleic acid anhydride, itaconic acid and itaconic acid anhydride, fumaric acid and ester of maleic acid and glycidyl acrylate for exampled glycidylmethacrylate. In such cases the polyamide preferably contains sufficient amino-end groups which can react with the functional groups. The functionalised ethylene-α-olefin copolymer is in case of a polyamide-6 preferably functionalised with maleic acid anhydrid. The maleic acid anhydrid content of the functionalised rubber may vary within wide limits, for example between 0.1 en 10 wt. %, preferably between 0.1 and 5 wt. %, more preferably between 0.1 and 2 wt. %.

The amount of oligomer relative to the amount of impact modifier in general depends on the type of applied oligomer. Preferably, the polyamide composition comprises from 5 to 70 wt. % oligomer, more preferably from 20 to 50 wt. % oligomer and even more preferably from 30 to 40 wt. % oligomer relative to the amount of impact modifier.

Various types of reinforcing compounds can be used in the polyamide compositions, e.g. minerals (such as talc wollastonite, kaolin), and fibres. A wide variety of fibres can be used, both with respect to their dimensions and their chemical composition. Fibres having suitable dimensions are fibres with an average aspect ratio (ratio of length to diameter) in the polyamide composition of between 5 and 100 and a diameter of between 1 and 20 microns, preferably between 8 and 15 microns. Suitable types of fibres include both natural and man-made fibres, such as carbon, mineral, polymer- and glass fibres. Suitable polymer fibres are polyaramid fibres. Particularly preferred fibres for the moulded parts according to the invention are glass fibres. The fibres are preferably coated with e.g. a silane compound in order to improve their adhesion to the polyamide composition.

In a particular preferred embodiment of the present invention, the polyamide composition comprises between 30-80 wt. % polyamide, between 0.1-20 wt. % polyamide oligomer, between 4-20 wt. % impact modifier and between 20-50 wt. % reinforcing material (the total amount being 100 wt. %). The present invention therefore in particular relates to an air bag container consisting of a polyamide composition that comprises between 30-80 wt. % polyamide, between 0.1-20 wt. % polyamide oligomer, between 4-20 wt. % impact modifier and between 20-50 wt. % reinforcing material (the total amount being 100 wt. %).

The polyamide composition can be obtained by mixing the components by any known method. For instance the components may be dry blended and consequently fed into a melt mixing apparatus, preferably an extruder. Also the components can be directly fed into a melt mixing apparatus and dosed together or separately. Preference is given to an extruder as melt mixing apparatus. In that case the composition is obtained in pellets that can be used for manufacturing the air bag container according to the invention. Preferably the melt mixing is performed in an inert gas atmosphere and the materials are dried before mixing.

In a preferred embodiment of preparing the polyamide composition, the base polyamide and the impact modifier are fed into the extruder via the throat and at least a part, preferably the total amount of reinforcement compounds, is fed to the melt comprising at least the base polyamide and the impact modifier. The flow improver is preferably fed to the melt comprising the base polyamide and the impact modifier, more preferably the flow improver is fed to the melt comprising the base polyamide, the impact modifier and the reinforcing compounds.

It has surprisingly been found that the advantageous effects of the invention are even more pronounced when the polyamide composition is prepared by blending, in a first step, the base polyamide and the impact modifier to obtain a continuous polyamide matrix and rubber particles dispersed therein, and by blending into the blend obtained in the first step, the flow improver. Preferably, the reinforcing compounds are added to the blend comprising the base polyamide and impact modifier prior to blending the flow improver into said blend. Preferably, the blending is effected in an extruder.

The invention will now be further elucidated on the basis of the following Examples and Comparative Experiments.
Materials Used:
Impact modifier: Exxelor VA 1801, an ethylene-propylene copolymer containing 0.6 wt. % of grafted maleic anhydride, with a melt flow index (MFI) of 8 g/10 min (230° C./10 kg).
Polyamide 6 (PA 6): Akulon K122 from DSM N.V. with a relative solution viscosity (RSV) in formic acid (1 g/100 ml) of 2.28.
Glass fibres: CS 173X-11P from Owens Corning with a fiber diameter of 11 μm.
Flow improver: PA 4.6 oligomer with weight-average $M_w$=2000 g/mole and $T_{melt}$=295° C.
Determination of the Physical Properties:
Melt Volume-Flow Rate (MVR) measured as described above.
Dynamic burst pressure at −35° C. measured as described above.
Comparative Experiment A
A mixture of PA-6 and glass fibres was prepared by feeding the two components to a co rotating twin-screw extruder (90 mm) at a screw speed of 300 r. p. m. and a throughput of 1000 kg/hour. The glass fibres were added via a side-feed. The molten strands were cooled in a water bath, cut into granules and dry-cooled before packaging in laminated bags. The MVR of the product was determined as indicated above. The granules were injection moulded into moulded parts as shown in FIGS. 1-3 having dimensions as indicated in the specification above. The dynamic burst pressure at −35° C. was measured as indicated above. The results are given in Table 1.

Comparative Experiment B
A mixture of PA-6, impact modifier and glass fibres was prepared by feeding the components to a co rotating twin-screw extruder (90 mm) at a screw speed of 300 r. p. m and a throughput of 1000 kg/hour. The glass fibres were added via a side-feed. The molten strands were cooled in a water bath, cut into granules and dry-cooled before packaging in laminated bags. The MVR of the product was determined as indicated above. The granules were injection moulded into an moulded into parts as shown in FIGS. 1-3 and having dimensions as indicated in the specification above. The dynamic burst pressure at −35° C. was measured as indicated above. The results are given in Table 1.

Comparative Experiment C
A mixture of PA-6, glass fibres and flow improver was prepared by feeding the components to a co rotating twin-screw extruder (90 mm) at a screw speed of 300 r. p. m. and a throughput of 1000 kg/hour. The glass fibres were added via a side-feed. The flow improver was added to the mixture of PA-6 and glass fibres. The molten strands were cooled in a water bath, cut into granules and dry-cooled before packaging in laminated bags. The MVR of the product was determined as indicated above The granules were injection moulded into an moulded into parts as shown in FIGS. 1-3 and having dimensions as indicated in the specification above. The dynamic burst pressure at −35° C. was measured as indicated above. The results are given in Table 1.

Example 1

A mixture of PA-6, glass fibres, impact modifier and flow improver was prepared by feeding the components to a co rotating twin-screw extruder (40 mm), with a melt temperature 320° C., at a screw speed of 450 r. p. m and a throughput of 250 kg/hour. The PA-6 and the impact modifier were added at the throat of the extruder. The glass fibres were added via a side-feed. The flow improver was added to the mixture of PA-6, impact modifier and glass fibres. The molten strands were cooled in a water bath, cut into granules and dry-cooled before packaging in laminated bags.

The MVR of the product was determined as indicated above. The granules were injection moulded into an moulded into parts as shown in FIGS. 1-3 and having dimensions as indicated in the specification above. The dynamic burst pressure at −35° C. was measured as indicated above. The results are given in Table 1.

TABLE 1

| Composition (amount in wt % relative to the total composition) | Comparative Experiment A | Comparative Experiment B | Comparative Experiment C | Example 1 |
|---|---|---|---|---|
| PA 6 | 59.7 | 53.7 | 57.3 | 51.5 |
| Glass fibre | 40 | 40 | 40 | 40 |
| Mold release agent (EBS) | 0.3 | 0.3 | 0.3 | 0.3 |
| Impact modifier |  | 6 |  | 6 |
| Flow improver |  |  | 2.4 | 2.2 |
| MVR ($cm^3$/10 minutes) | 24 | 15 | 50 | 47 |
| Dynamic burst pressure (MPa) | 1.8 | 2.2 | 1.2 | 2.1 |

Example 1 is characterized by high flow ability, without significantly compromising the burst pressure performance compared to comparative experiment B, which is a common material for the manufacturing of airbag canisters. Comparative experiments A and C show that a higher flow can be realized for non impact modified materials, but this results in a substantial reduction of the dynamic burst pressure performance.

The invention claimed is:

1. An air bag container consisting of an impact modified polyamide composition, wherein the polyamide composition has a Melt Volume-Flow Rate higher than 25 cm$^3$/10 minutes (275° C./5 kg), and said polyamide composition comprises a base polyamide, an impact modifier, reinforcing compounds and a flow improver, the flow improver being a polyamide oligomer.

2. An air bag container according to claim 1, wherein the polyamide composition comprises impact modifier in an amount higher than 4 wt. % relative to total weight of the polyamide composition.

3. An air bag container according to claim 1, wherein the polyamide composition comprises an impact modifier in an amount less than 30 wt. % relative to total weight of the polyamide composition.

4. An air bag container according to claim 1, wherein the polyamide composition comprises, as an impact modifier, olefinic rubbers chemically modified with maleic anhydride.

5. An air bag container according to claim 1, wherein the polyamide composition comprises a base polyamide in an amount of from 30 to 80 wt. % relative to total weight of the polyamide composition.

6. An air bag container according to claim 1, wherein the polyamide composition comprises a flow improver in an amount of from 0.1 to 50 wt. % relative to total weight of the polyamide composition.

7. An air bag container according to claim 1, wherein the polyamide oligomer has a weight average molecular weight $M_w$ of between 1000 and 5000 g/mol.

8. An air bag container according to claim 1, wherein the polyamide oligomer is present in an amount of from 0.1 to 20 wt. % relative to total weight of the polyamide composition.

9. An air bag container according to claim 1, wherein the polyamide oligomer is selected from the group consisting of a polyamide-6 oligomer, a polyamide-4,6 oligomer, a polyamide-6,6 oligomer and mixtures thereof.

10. An air bag container according to claim 1, wherein the composition comprises an impact modifier and an oligomer, and wherein the oligomer is present in an amount from 5 to 70 wt. %, relative to the oligomer.

11. An air bag container according to claim 1, wherein the base polyamide is a polyamide-6.

12. An air bag container according to claim 1, wherein the reinforcing compounds are glass fibres.

13. An air bag container according to claim 1, wherein the polyamide composition is prepared by blending, in a first step, the base polyamide and the impact modifier to obtain a continuous polyamide matrix and rubber particles dispersed therein, and by blending into the blend obtained in the first step, the flow improver.

* * * * *